United States Patent [19]

Kanda

[11] Patent Number: 4,710,687

[45] Date of Patent: Dec. 1, 1987

[54] SEEK OPERATION CONTROL APPARATUS

[75] Inventor: Hiroyuki Kanda, Tokyo, Japan

[73] Assignee: Kabushiki Kaisha Toshiba, Kawasaki, Japan

[21] Appl. No.: 901,882

[22] Filed: Aug. 29, 1986

[30] Foreign Application Priority Data

Aug. 30, 1985 [JP] Japan ................. 60-191565

[51] Int. Cl.$^4$ ............................. G05B 13/00
[52] U.S. Cl. ...................... 318/561; 360/78
[58] Field of Search .......................... 318/561; 360/78

[56] References Cited

U.S. PATENT DOCUMENTS 4,439,800 3/1984 Powell ................. 360/78

Primary Examiner—William M. Shoop, Jr.
Assistant Examiner—Saul M. Bergmann
Attorney, Agent, or Firm—Finnegan, Henderson, Farabow, Garrett & Dunner

[57] ABSTRACT

A seek operation control apparatus includes first and second position signal generators. By using a position signal from the first position signal generator, the head can be driven and moved before a track position to be moved is designated in the seek mode. After the seek instruction is completely input, the second position signal generator is used to generate a position signal having a predetermined waveform at the track position designated by the seek instruction. When the head comes close to the designated track position, the position signal is switched to accurately move the head to the designated position at high speed.

12 Claims, 14 Drawing Figures

FIG. 3
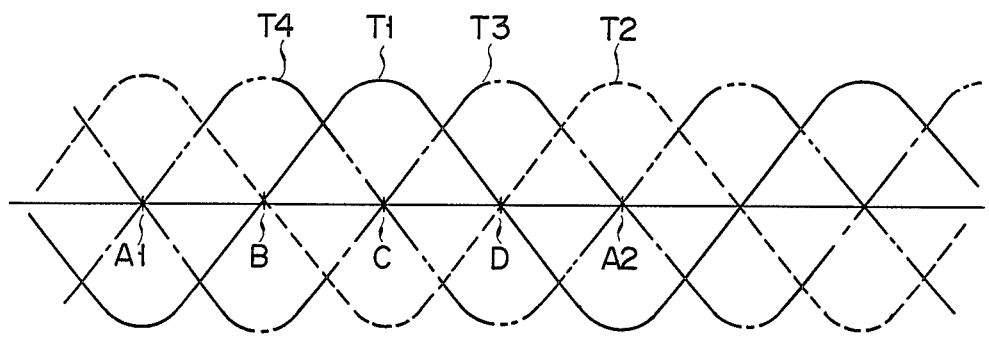
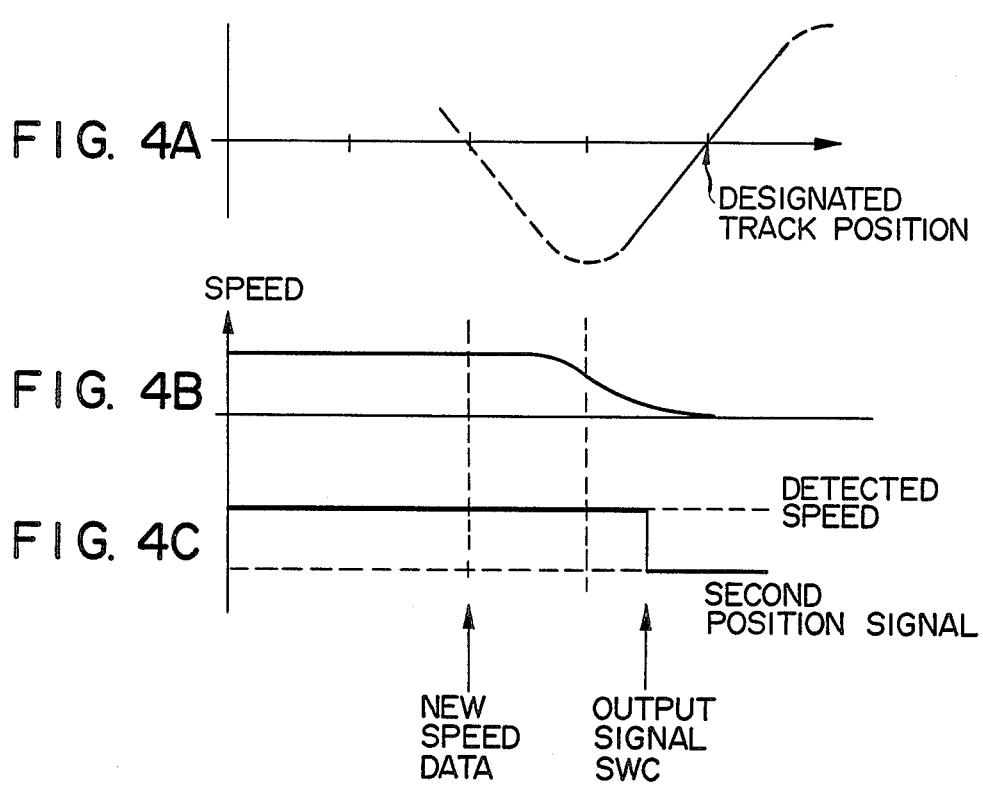

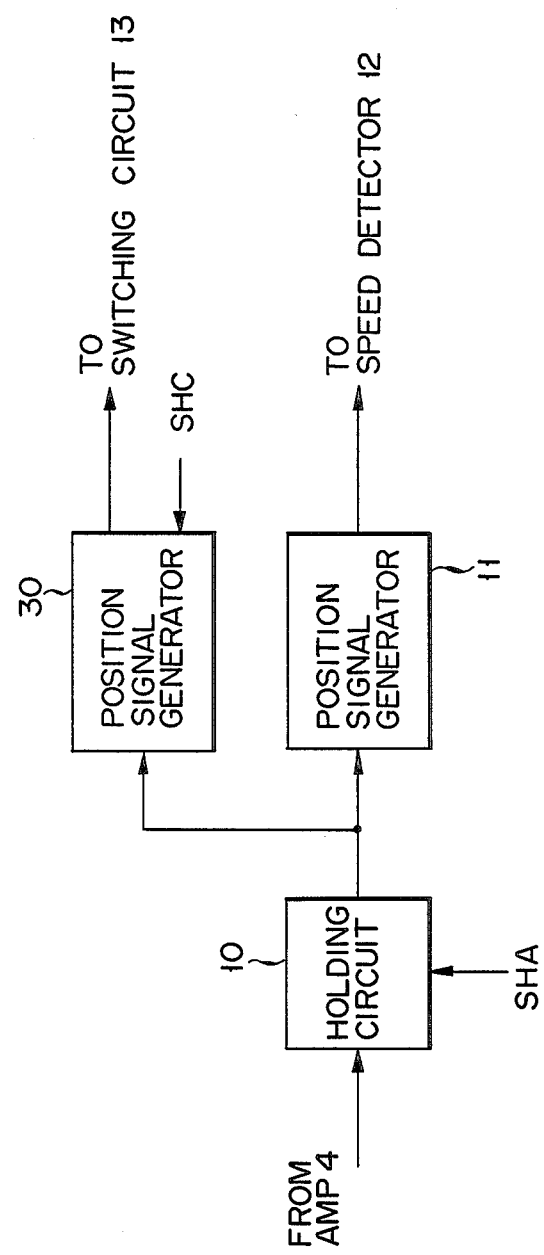

SEEK OPERATION CONTROL APPARATUS

BACKGROUND OF THE INVENTION

The present invention relates to a seek operation control apparatus and, more particularly, to an apparatus for accurately controlling and driving a magnetic head at high speed when a seek instruction is input to a magnetic disk system.

A typical conventional magnetic head position control scheme is based on servo data pre-recorded on a magnetic disk in a magnetic disk system. In such a magnetic disk system, in order to move a magnetic head to a track position designated by an input seek instruction, head position control is classified into speed control, transition control, and positioning control.

Speed control is control for driving a carriage to move the magnetic head to a track position designated by the seek instruction. Transition control is intermediate control between speed control and positioning control so as to stop the magnetic head at the designated track position. Positioning control is control for holding the magnetic head at the designated track position. Positioning control is normally performed using a position signal having a predetermined waveform at the designated track position.

When a pulse signal including the number of pulses corresponding to the number of tracks for the magnetic head to be moved is supplied as a seek instruction in an interface between a magnetic disk controller and the seek operation control apparatus, if the magnetic head is moved after the pulse signal is completely received, a predetermined position signal used in positioning control can be selected. However, this results in a lengthy seek operation since the magnetic head is not allowed to begin moving until the pulse signal is completely received.

SUMMARY OF THE INVENTION

The present invention has been made in consideration of the above situation, and has as its object to provide a head seek operation control apparatus for accurately performing a seek instruction at high speed. A head seek operation control apparatus comprising:

readout means for reading out data recorded on a disk and indicating a track position, and for outputting the position data corresponding to the readout data;

first generation means for generating a first position signal on the basis of the position data from the readout means, in accordance with a first instruction;

second generation means for generating a second position signal on the basis of the position data from the readout means, in accordance with a second instruction;

speed difference signal generating means for generating a speed difference signal on basis of input designated speed data and the first position signal generated by the first generation means;

switching means for selectively outputting one of the input second position signal and the input speed difference signal in accordance with a input third instruction;

control means for generating the designated speed data such that the head is driven before a seek instruction is completely input and that the magnetic head stops at the track position designated by the seek instruction in response to a detection of the distance equal to a first predetermined distance, for outputting the first instruction based on the position data, for outputting the second instruction, before the third instruction is output after the seek instruction is completely input, such that the second position signal has a predetermined waveform at the track position designated by the seek instruction, for detecting the distance between the track position designated by the seek instruction and the current track position of the head based on the first position signal, for generating the third instruction in response to a detection of the distance equal to a second predetermined distance; and head position driving means for driving the head on the basis of the input speed difference signal.

According to the present invention as described in detail above, the head is driven and moved before the seek instruction input operation is completed, thus shortening the actual seek instruction execution time. In addition, an apparatus failure caused by an abnormal signal, i.e., a surge signal component in the speed signal, upon position signal switching required to realize the short time seek operation, can be prevented, thereby achieving accurate position control.

BRIEF DESCRIPTION OF THE DRAWINGS

Fig. 3 shows a waveform of a position signal output from a position signal generator shown in FIG. 1;

FIG. 4A shows a predetermined position signal at a stop track position;

FIG. 4B shows a moving speed of the magnetic head;

FIG. 4C shows switching from speed data to a second position signal;

FIG. 6 is a block diagram of an arrangement for generating a second position signal according to another embodiment of the present invention.

DETAILED DESCRIPTION OF THE PREFERRED EMBODIMENTS

A seek operation control apparatus according to an embodiment of the present invention will be described with reference to the accompanying drawings.

Figure 1:
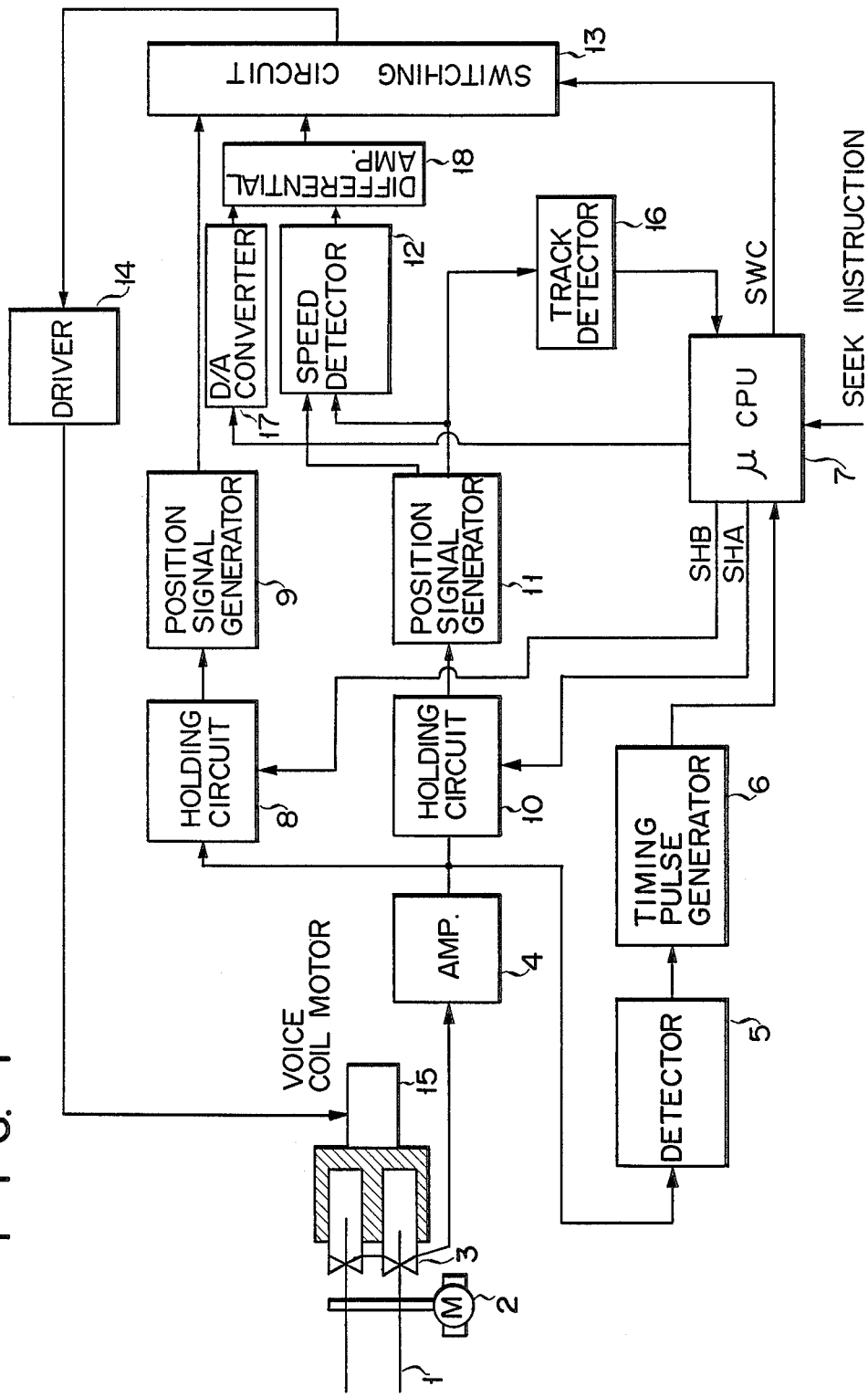
FIG. 1 is a block diagram of a seek operation control apparatus according to an embodiment of the present invention.
Figure 2:
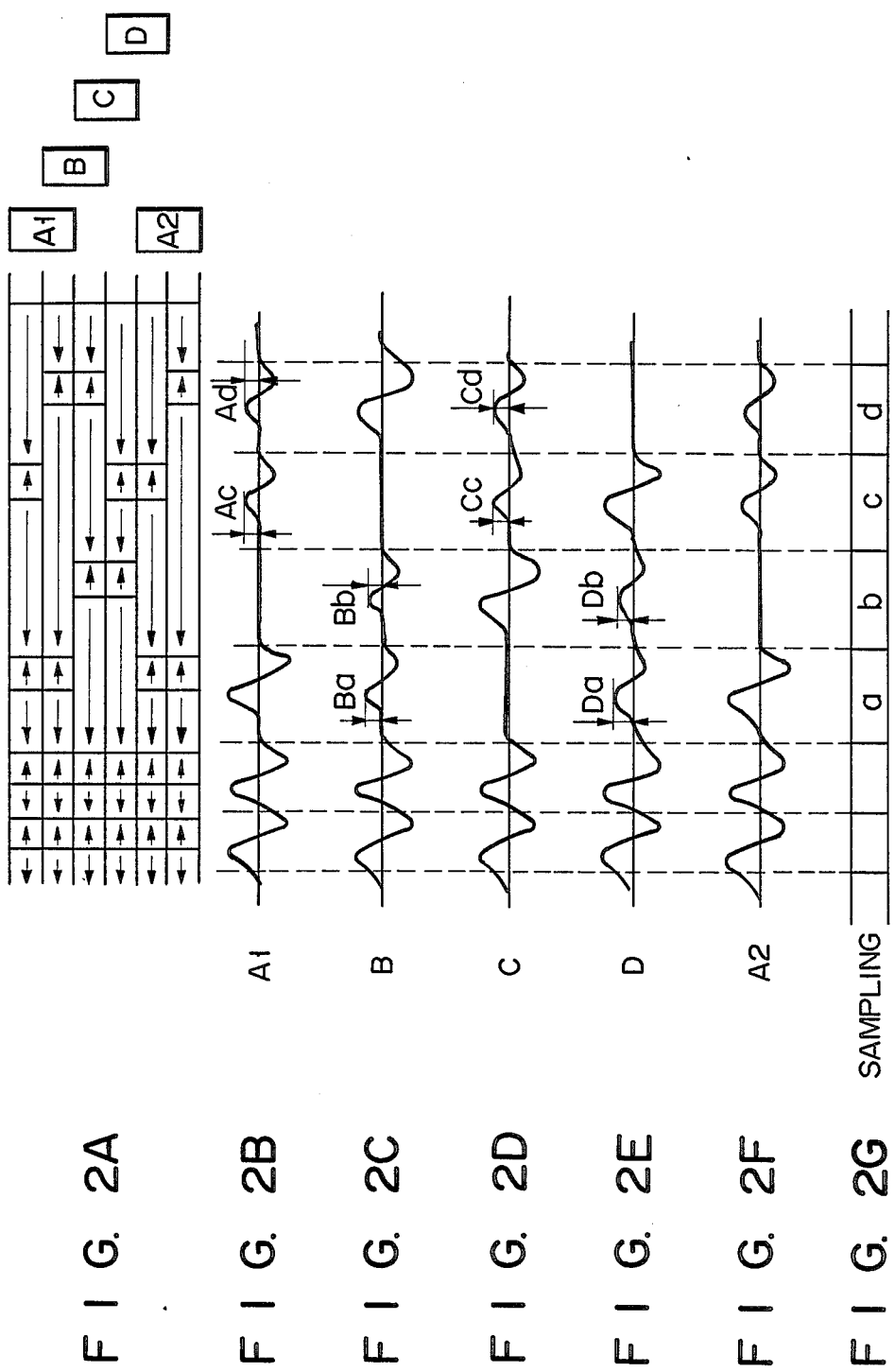
Fig. 2A the position relationship between a magnetic head and a format of servo data recorded on a disk.
FIGS. 2B to 2F waveforms of signals corresponding to servo data which is read by the magnetic head and amplified by an amplifier.
Fig. 2G shows sample timings of the above signals.

The arrangement of the seek operation control apparatus will be described with reference to FIG. 1. The apparatus includes magnetic disk 1 rotated by spindle motor 2. Servo data is pre-recorded on magnetic disk 1, as shown in FIG. 2A. Servo data read out by magnetic head 3 is amplified. The signal amplified by amplifier 4 is output to detector 5. Detector 5 detects the presence or absence of the signal amplified by amplifier 4. A detection signal is output to timing pulse generator 6. In response to the input signal from detector 5, generator 6 supplies a timing pulse to $\mu$CPU 7 to hold the signal read out by magnetic head 3 and amplified by amplifier 4. $\mu$CPU 7 generates signals SHA and SHB based on the current position of head 3. Signal SHA is supplied to holding circuit 10 and signal SHB is supplied to holding circuit 8.

Holding circuit 10 receives the signal from amplifier 4 and holds it in response to signal SHA from $\mu$CPU 7.

The held signal is then output to position signal generator 11. Generator 11 generates a position signal consisting of four sinusoid-like wave signals, whose phases are shifted by 90° with respect to each other, by synthesizing them in a predetermined combination. A signal corresponding to the speed of one of the sinusoid-like wave signals is output to speed detector 12 and track detector 16. The other three signals are output to speed detector 12. Track detector 16 detects zero-crosses of the input sinusoid-like wave signal, and supplies to µCPU 7 a signal indicating that the magnetic head passes over the track. Speed detector 12 detects a speed signal from the input position signals, and outputs the detected speed signal to differential amplifier 18.

Signal SHB is output from µCPU 7 to holding circuit 8. Holding circuit 8 is operated in the same manner as in holding circuit 10. In response to signal SHB, holding circuit 8 holds the signal supplied from amplifier 4 and the held signal is output to position signal generator 9. The position signal generated by position signal generator 9 is output to switching circuit 13. µCPU 7 outputs designated digital speed data to D/A converter 17. Converter 17 performs D-A conversion of the input designated speed data and a designated speed signal as a result of the conversion is output to differential amplifier 18. Amplifier 18 generates and outputs to switching circuit 13 a speed difference signal corresponding to the difference between the designated speed signal from D/A converter 17 and the detected speed signal from speed detector 12. Speed detector 12 and differential amplifier 18 act as a speed difference detecting circuit. Switching circuit 13 selectively outputs one of the outputs from differential amplifier 18 and position signal generator 9 in response to control signal SWC from µCPU 7. An output from switching circuit 13 is input to driver 14. Voice coil motor 15 is driven by driver 14 so that the position of head 3 is changed based on the output from switching circuit 13.

Figure 5:
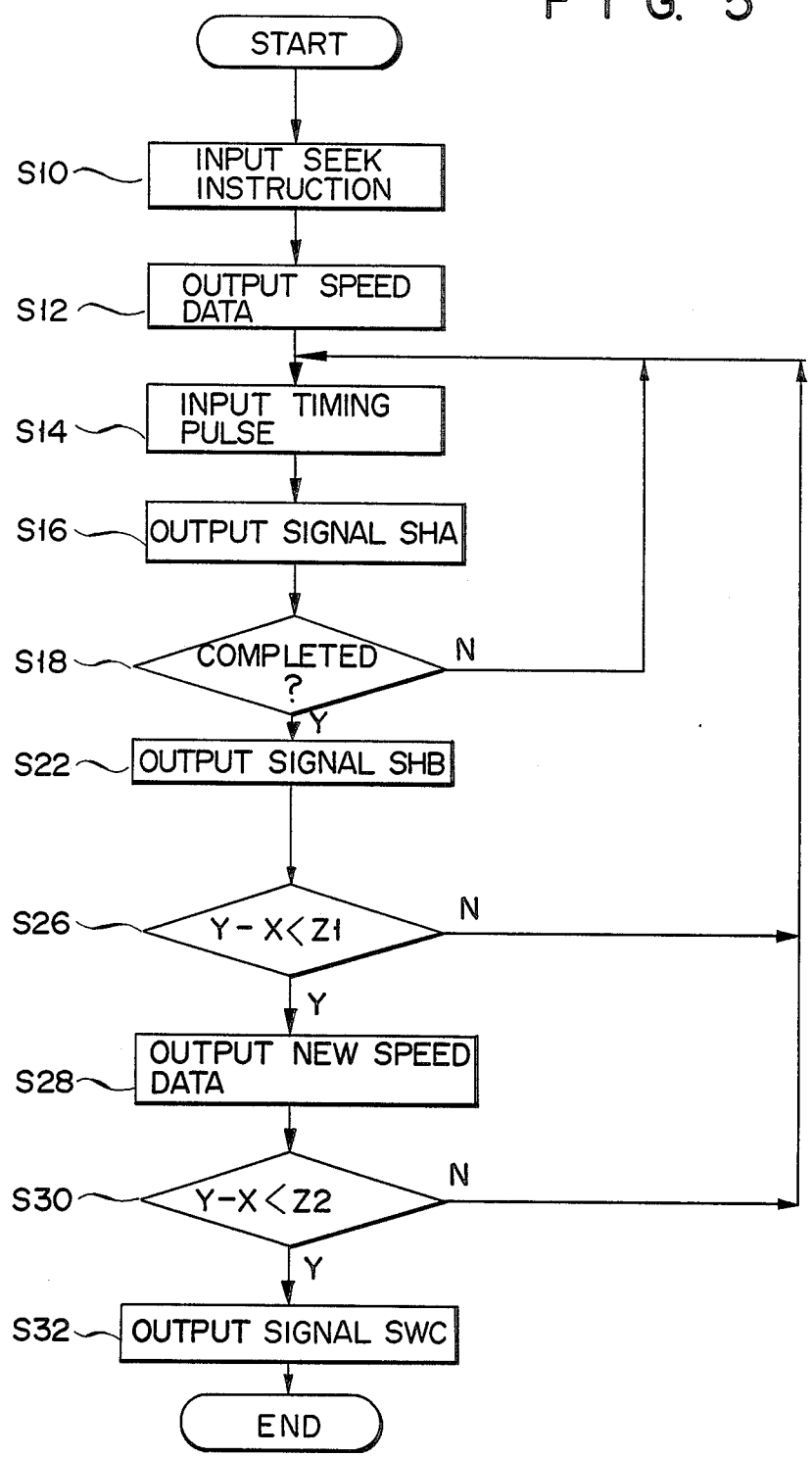
FIG. 5 is a flow chart for explaining the operation of the apparatus in FIG. 1.

The operation of the apparatus will be described with reference to the flow chart in FIG. 5.

An external seek instruction is input to µCPU 7 (step S10). In step S12, µCPU 7 outputs the designated speed data to D/A converter 17 before the track to which head 3 is moved is determined, i.e., before the number of pulses is completely received which corresponds to the number of tracks from a current track to a designated track by the seek instruction. At the same time, switching circuit 13 supplies an output from amplifier 18 to driver 14 in accordance with signal SWC from µCPU 7. Driver 14 drives voice coil motor 15 according to an output of circuit 13, thereby causing head 3 to seek a designated track position on disk 1.

Magnetic head 3 starts moving along disk 1 while reading servo data. The signal corresponding to the read servo data is amplified by amplifier 4.

The servo data corresponding to head positions is pre-recorded on disk 1 as shown in FIG. 2A. In this embodiment, four types of format data are recorded. If head 3 is located at point A1, B, C, or D, each servo data is read. The readout servo data is amplified by amplifier 4. The resultant amplified signal waveforms corresponding to points A1, B, C and D are shown in FIGS. 2B to 2E, respectively.

The amplified signal is input to detector 5. Detector 5 determines whether the input signal is a significant signal having a level higher than a predetermined level. The detection result is supplied to timing pulse generator 6. Generator 6 generates the timing pulse in response to the input and the timing pulse is supplied to µCPU 7 (step S14).

µCPU 7 outputs signal SHA to holding circuit 10 in response to the timing pulse from generator 6 in step S16. The signal amplified by amplifier 4 and depending on the position of head 3 is held by holding circuit 10. For example, if magnetic head 3 is located at point A1 in FIG. 2A, the signal from amplifier 4 is held in response to sampling signals c and d. The holding operation for point A2 is the same as that for A1. Similarly, if magnetic head 3 is located at point B, C, or D, the signal from amplifier 4 is held in response to sampling signals a and b, d and c, or b and a.

The held data is input to position signal generator 11. Generator 11 calculates differences between the input signals and generates the position signal. For example, if magnetic head 3 is located at point A1, the position signal obtained is represented by the value (Ac-Ad) obtained by subtracting peak value Ad held in response to sampling signal d from peak value Ac held in response to sampling signal c. The operation for point A2 is the same as that for A1. Similarly, the position signal, obtained when magnetic head 3 is located at point B, C, or D, can be represented by (Ba-Bb), (Cd-Cc), or (Db-Da), respectively.

The differences are plotted upon the movement of magnetic head 3 to obtain the position signal as an alternating signal (FIG. 3), i.e., a sinusoid-like wave signal. Reference symbol T1 corresponds to servo data D; T2, servo data B; T3, servo data A; and T4, servo data C. Such detailed operation is disclosed in U.S. Pat. No. 4,238,809.

Speed detector 12 detects and outputs to amplifier 18 the moving speed signal of magnetic head 3 on the basis of the position signals from position signal generator 11. The speed difference signal, corresponding to a difference between the designated speed data signal from D/A converter 17 and the detected speed signal from speed detector 12, determined by amplifier 18 is output to switching circuit 13. Since the position of magnetic head 3 is relatively far away from the track position designated by the seek instruction, switching circuit 13 selectively outputs the output from amplifier 18 on the basis of the control signal SWC from µCPU 7. Driver 14 drives voice coil motor 15 so as to drive magnetic head 3 based on the speed difference signal.

During the operations described above, µCPU 7 determines in step S18 whether the pulses corresponding to the seek instruction are completely received. If NO in step S18, µCPU 7 an output of circuit 13, Thereafter, the flow returns to step S14.

If YES in step S18, step S22 is executed. Signal SHB is output from µCPU 7 to holding circuit 8 such that the position signal output from position signal generator 9 has the predetermined waveform shown in FIG. 4A at the track position designated by the seek instruction. When the zero-crossing and passing of magnetic head 3 through the designated track, the position signal with the predetermined waveform is positive and has a magnitude substantially corresponding to a distance from the designated track position. The position signal with the predetermined waveform, generated when magnetic head 3 is located before the designated track position, is negative and has a magnitude corresponding to a distance from the designated track position. The position signal with the predetermined waveform is selected from the four position signals described above. The position signal with the predetermined waveform can be a position signal with reverse polarization to the above-mentioned signal. The selected signal is output to switching circuit 13. Step S22 can be executed before step S32.

During generation of the position signal, the position signal from position signal generator 11 is also supplied to track detector 16. Track detector 16 generates and outputs to μCPU 7 a cylinder pulse when a given position signal crosses the zero level, and μCPU 7 counts cylinder pulses to detect the current track position of magnetic head 3.

μCPU 7 then determines in step S26 whether magnetic head 3 has reached a track position close to the track position designated by the seek instruction. If a distance between the track position prior to seek operation and the track position designated by the seek instruction is given as Y and the distance between the track position prior to seek operation and the current track position of magnetic head 3 is given as X, μCPU 7 determines whether the difference therebetween is smaller than predetermined value Z1, e.g., within 2 tracks. If NO in step S26, the flow returns to step S14.

However, if YES in step S26, step S28 is executed and μCPU 7 outputs new designated speed data to amplifier 18 through converter 17 to stop magnetic head 3 at the designated track position. Therefore, the speed of head 3 is gradually reduced.

In step S30, the distance from the current position to the designated track position is obtained in the same manner as in step S26. μCPU 7 then determines in step S30 whether the difference is smaller than predetermined value Z2, e.g., within one track. If NO in step S30, the flow returns to step S14. However, if YES, step S32 is executed. In step S32, μCPU 7 outputs signal SWC to switching circuit 13. Switching circuit 13 switches the data input source from amplifier 18 to position signal generator 9 in response to signal SWC, as shown in FIG. 4C.

Final control is performed to cause magnetic head 3 to stop at the track position designated by the seek instruction using the position signal from generator 9.

A circuit arrangement for generating a second position signal according to another embodiment of the present invention will be described with reference to FIG. 6. In this embodiment, position signal generator 30 receives an output from holding circuit 10. In the same operation as in step S22 of FIG. 5, generator 30 generates a position signal having a predetermined waveform at the designated track position in response to signal SHC from μCPU 7. Other operations are the same as those in the flow chart of FIG. 5.

I claim:

1. A seek operation control apparatus comprising:
readout means for reading out data recorded on a disk that indicates a track position, and for outputting position data corresponding to the readout data;
first generation means for generating a first position signal on the basis of the position data from said readout means, in accordance with a first instruction;
second generation means for generating a second position signal on the basis of the position data from said readout means, in accordance with a second instruction, the second position signal having a predetermined waveform;
speed difference detecting means for detecting a speed signal with respect to the head in accordance with the first position signal from said first generation means, and for determining and outputting a speed difference signal representing a speed difference between the detected speed signal and a designated speed signal input thereto;
switching means for selectively outputting one of the second position signals from said second generation means and the speed difference signal from said speed difference signal generation means in accordance with an input third instruction;
control means for detecting a distance between a current track position of said head and a destination track position designated by a seek instruction based on the first position signal, for outputting the designtated speed signal to said speed difference detecting means such that a drive operation of said head is initiated before a seek instruction is completely input and such that the speed of said head is decelerated gradually from a first predetermined distance to the destination track position, said control means for outputting the first instruction to said first generation means based on the position data, and for outputting the second instruction prior to the third instruction after the seek instruction is completely input, and for generating the third instruction when said head reaches within a second predetermined distance; and
head position driving means for driving said head on the basis of said input speed difference signal.

2. The apparatus according to claim 1, wherein said control means comprises:
position detecting means for generating a signal indicating that said head passes over the track, based on the first position signal, and for determining a distance between the current track position and the destination track position;
first instruction output means for outputting the first instruction to said first generating means based on the position data;
second instruction output means for outputting the second instruction to said second generating means, after the seek instruction is completely input, and before the third instruction is output;
third instruction output means for outputting the third instruction to said switching means when it is detected by said position detecting means that said head has reached the second predetermined distance; and
speed data output means for designating and outputting to said speed difference detecting means the designated speed signal for said head to be driven.

3. The apparatus according to claim 2, wherein said first generation means comprises:
first holding means for holding the position data in response to the first instruction from said control means; and
first position signal generating means for generating the first position signal on the basis of the data held by said first holding means.

4. The apparatus according to claim 3, wherein said second generation means comprises:
second holding means for holding the position data in response to the second instruction from said control means; and
second position signal generating means for generating the second position signal on the basis of the data held by said second holding means.

5. The apparatus according to claim 3, wherein said second generation means comprises third position signal generating means for generating the second position signal on the basis of the data held by said first holding means.

6. The apparatus according to claim 2, wherein different types of format data representing track positions of said head are pre-recorded on said disk at a given interval, the first and second position signals being alternating signals.

7. The appparatus according to claim 6, wherein said first and second position signal generating means calculate the difference between two predetermined adjacent data among all adjacent data and generate the first and second position signals, respectively, the first position signal including four sinusoid-like wave signals, the second position signal being a sinusoid-like wave signal with the predetermined waveform.

8. The apparatus according to claim 7, wherein the predetermined waveform has a magnitude substantially corresponding to the distance from the destination track position, and is positive when said head passes through the destination track position and is negative when said head is located before the destination track position.

9. The apparatus according to claim 7, wherein the predetermined waveform has a magnitude substantially corresponding to the distance from the destination track position, and is negative when said head passes through the destination track position and is positive when said head is located before the destination track position.

10. The apparatus according to claim 2, wherein the seek instruction is a pulse sequence signal whose number of pulses correspond to the number of tracks for said head to be displaced.

11. The apparatus according to claim 2, wherein the first predetermied distance is a distance corresponding to two track intervals.

12. The apparatus according to claim 2, wherein the second predetermined distance is a distance corresponding to one track interval.

* * * * *